Dec. 19 1922.

I. KING.
MULTIPLE CHAMBER OVEN.
FILED APR. 6. 1921.

1,439,172

INVENTOR:
Ivan King.
BY
Graham+ Quinn
ATTORNEYS.

Patented Dec. 19, 1922.

1,439,172

UNITED STATES PATENT OFFICE.

IVAN KING, OF LOS ANGELES, CALIFORNIA.

MULTIPLE-CHAMBER OVEN.

Application filed April 6, 1921. Serial No. 458,965.

*To all whom it may concern:*

Be it known that I, IVAN KING, a citizen of the United States, residing at Los Angeles, county of Los Angeles, and State of California, have invented a new and useful Multiple-Chamber Oven, of which the following is a specification.

This invention relates to the manufacture of ovens and is peculiarly adaptable to those ovens in which the baking process is proceeded with as a continuous operation.

I have found that in the construction of continuous operating ovens it is very difficult to provide for an even distribution of heat from the top and bottom of the baking chamber, due to the fact that the application of heat is mainly from a single direction, and therefore enters the baking chamber from but one portion of its radiating surfaces, whereby a very uneven heat is maintained within the baking chamber making entirely satisfactory results very difficult to obtain.

It is an object of my invention to provide an oven in which the baking chambers are subjected to the application of heat from above as well as from below, and also to provide such an oven in which the baking chambers will be maintained at a slightly greater temperature in the forward portion than in the rear.

It is a further object to provide an oven comprising a battery of baking chambers, the heat for operation of which will be supplied from a single source, thereby providing an even temperature within the several baking chambers. Further objects will become evident hereinafter.

With reference to the drawing which is for illustrative purposes only;

Similar parts are represented by similar characters throughout the several views of the drawing.

Figure 1:
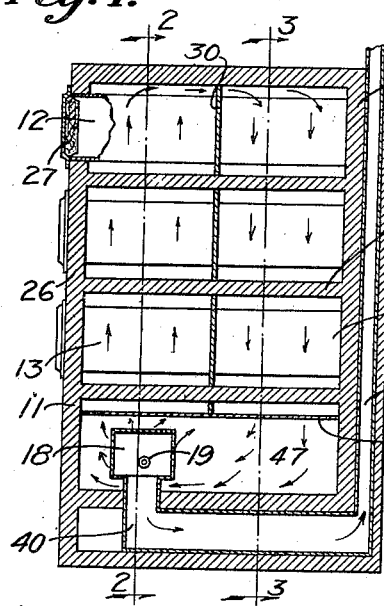
Fig. 1 is a vertical cross section of the construction I employ and is taken on a plane represented by the line 1—1 of Fig. 2.

The embodiment of my invention shown consists of a surrounding wall structure 11 which is made to enclose a series of superimposed baking chambers 12 in such a manner as to provide circulating channels 13 and 14 around said baking chambers, and a source of heat such as a combustion chamber 18 having a suitable oil or gas burner 19 extending inwardly through a port 20.

The baking chambers 12 are constructed of some heat conducting material, preferably sheet iron, and extend from the rear wall 25 to the front wall 26 in which are located the charging doors 27. The sides 28 are insulated as shown to prevent the radiation of heat therethrough, which condition would cause a greater heating of the side portions of the baking chambers than of the central portions. It will be noticed that the circulating channels 13 and 14 are formed by dividing the existing baking chamber heating space surrounding the baking chambers by the use of centrally extending partition walls 30 and by laterally extending partition walls 31 placed perpendicularly to the partition walls 30.

The outer wall structure 11 is preferably of some heat insulating material such as kieselguhr brick reinforced with common brick, or it may be of sheet metal insulated with asbestos, and the inwardly extending division walls 35 are of the same construction as the outer wall. These division walls are discontinued at points 36 near the center to provide passages 37 between the ends 36 of the division walls 35 and the centrally extending partition walls 30.

The combustion chamber extends the full length of the oven structure and is located in the forward lower part thereof in a position underneath the circulating channels 13, as shown in Fig. 1 of the drawing, and a discharge flue 40 situated oppositely from the burner 19 is employed to carry the combustion gases back to a chimney or stack 41 from whence they are delivered into the open atmosphere.

Figure 2:
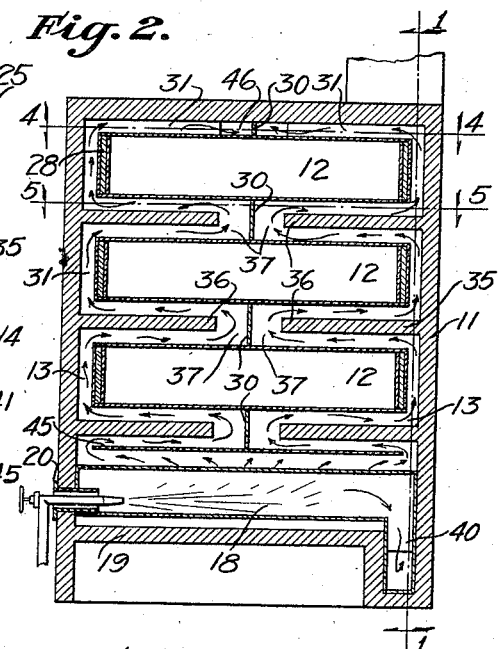
Fig. 2 is a vertical longitudinal section of the oven and is taken on a plane represented by the line 2—2 of Fig. 1.
Figure 4:
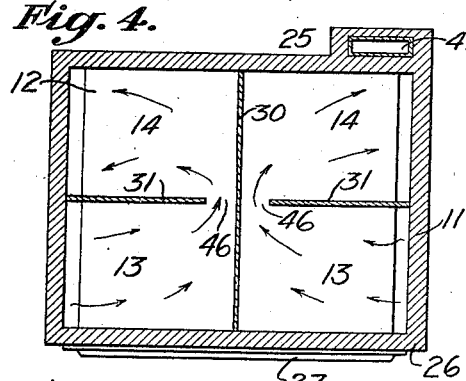
Fig. 4 is a section taken on a plane represented by the line 4—4 of Fig. 2.
Figure 5:
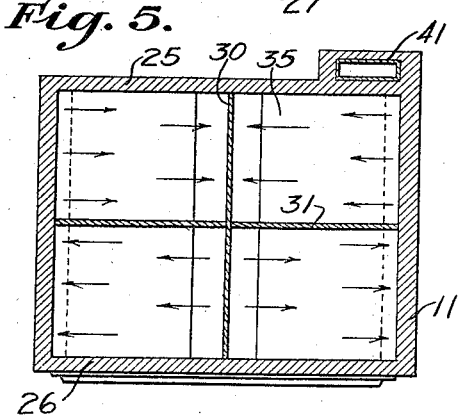
Fig. 5 is a section taken on a plane represented by the line 5—5 of Fig. 2.
Figure 3:
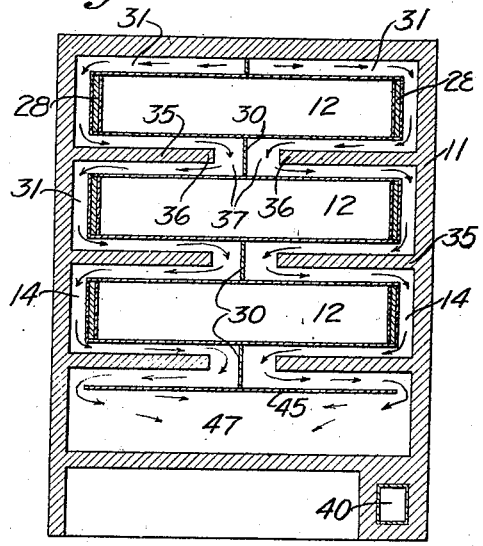
Fig. 3 is a vertical longitudinal section similar to that shown in Fig. 2, but is taken on a plane represented by the line 3—3 of Fig. 1.

The heat generated by the combustion of gases injected into the combustion chamber by the burner 19 is radiated through the walls of the combustion chamber, as indicated by the arrows in Fig. 1, heating the surrounding air which due to its lighter weight in heated condition rises and passes around a deflector plate 45 assuming an upward course through the circulating channels 13 which may be easily traced by reference to the indicating arrows in Fig. 2. In traveling around the division walls 35 on its upward course, the heated air is brought into contact with both the bottoms and the tops of each succeeding baking chamber, and as little heat radiates through the side walls 28 of the baking chambers the interiors thereof receive a very even heat. Upon reaching the highest point within the circulating chambers 13, the partially cooled air passes through an opening 46 provided between the upper ends of the partition walls 31 and the upper portion of the partition wall 30, as illustrated in Fig. 4 and assumes a downward course through the channels 14 as shown by the indicating arrows in Fig. 3 and passes in and out between the baking chambers in direction of flow opposite to that in the corresponding portions of the channels 13. Upon reaching the lower end of the circulation channel 14, the air passes out and around the deflector plate 45 into the collecting chamber 47 in a somewhat cooled condition and passes forward, as indicated by the arrows in Fig. 1, to again be heated by the conduction of heat through the walls of the combustion chamber and enters upon another circuit of the circulating channels.

I claim as my invention:

1. In a baker's oven the combination of: a heat insulated chamber provided with doors in the front wall thereof; a series of superimposed baking chambers formed of sheet iron and arranged one above the other inside said chamber, each baking chamber being accessible through one of said doors; horizontal inwardly extending division walls between adjacent baking chambers, said walls having an opening near the center thereof; partition walls extending vertically between adjacent baking chambers through the openings in said horizontal walls; and a combustion chamber in said heat insulated chamber below the lower baking chamber.

2. In a baker's oven the combination of: a heat insulated chamber provided with doors in the front wall thereof; a series of superimposed baking chambers formed of sheet iron and arranged one above the other inside said chamber, each baking chamber being accessible through one of said doors; horizontal inwardly extending division walls between adjacent baking chambers, said walls having an opening near the center thereof; partition walls extending vertically between adjacent baking chambers through the openings in said horizontal walls laterally extending partitions extending at right angles to said partition walls between said baking chambers; and a combustion chamber in said heat insulated chamber below the lower baking chamber.

3. A baker's oven comprising: a heat insulated chamber having door openings in the front thereof; a series of baking chambers formed of sheet metal and extending from front to back of said heat insulated chamber but being spaced from the walls of said chamber at the top, bottom and sides of said baking chambers; a series of horizontal walls between adjacent baking chambers; vertical centrally extending partition walls centrally located parallel to the front and back of said heat insulated chamber; vertical laterally extending partition walls centrally located parallel to the sides of said heat insulated chamber; and a heating means inside said chamber below the lower baking chamber, said horizontal walls and vertical partition walls being so perforated that there is a continuous circulation of heated air around all of said baking chambers.

In testimony whereof, I have hereunto set my hand at Los Angeles, California, this 28th day of March, 1921.

IVAN KING.